(12) United States Patent
Rehm et al.

(10) Patent No.: US 6,375,356 B1
(45) Date of Patent: Apr. 23, 2002

(54) LINEAR DRIVE

(75) Inventors: Karl Rehm, Mindelheim; Friedrich Windel, Landsberg, both of (DE)

(73) Assignee: Grob-Werke Dr. h.c. mult. Dipl.-Ing. Burkhart Grob e.K, Mindelheim (DE)

(*) Notice: Subject to any disclaimer, the term of this patent is extended or adjusted under 35 U.S.C. 154(b) by 0 days.

(21) Appl. No.: 09/640,001

(22) Filed: Aug. 17, 2000

(30) Foreign Application Priority Data

Aug. 18, 1999 (DE) .......................................... 199 39 207

(51) Int. Cl.⁷ ............................................. F16C 29/02
(52) U.S. Cl. ........................ 384/41; 384/25; 384/26
(58) Field of Search .................... 38/26, 41, 40, 38/25, 42, 7

(56) References Cited

U.S. PATENT DOCUMENTS 4,604,008 A * 8/1986 Bone .......................... 384/26
6,287,008 B1 * 9/2001 Bartelmuss et al. .......... 384/42

* cited by examiner

Primary Examiner—Lenard A. Footland
(74) Attorney, Agent, or Firm—Jacobson Holman, PLLC

(57) ABSTRACT

The invention concerns a linear drive consisting of a primary part (1) which can be arranged on a slider (90), where the slider (90) can be moved on a guide system, and a fixed secondary part (2) which interacts with the primary part (1) such that the slider (90) can be moved on the guide system. The primary part (1) can be separated from the slider (90) and moved on a bearing (3) relative to the slider (90).

14 Claims, 5 Drawing Sheets

LINEAR DRIVE

BACKGROUND OF THE INVENTION

The invention concerns a linear drive consisting of a primary part which can be arranged on a slider, where the slider can be moved on a guide system, and a fixed secondary part which co-operates with the primary part so that the slider can be moved on the guide system.

Such linear drives are commonly used in engineering. They are used for example in machining centres or machine tools in order to move and position the working spindle with high speed and high precision. The secondary part consists of an arrangement of magnets with changing polarity and is usually fixed. The secondary part co-operates with the primary part. The primary part consists of an electromagnetic drive in which the current flow is used to generate a magnetic field which co-operates with the magnetic field of the secondary part so that the slider moves on the guide system.

The invention is described below such that the primary part, i.e. the arrangement of coils and similar through which current flows, is located on the moving slider and the secondary part, i.e. the arrangement of magnets, is fixed. The invention is not however limited to this structure. It is also possible for the secondary part, i.e. the arrangement of magnets, to be arranged on the moving slider and the primary part to be fixed.

For example one or more parallel guide rails are used as a guide system. Between the primary and secondary parts is an air gap. This air gap is of relatively small dimension and finally determines the efficiency of the drive, too large an air gap leading to poorer efficiency and a higher power consumption.

With an arrangement where the movement path of the linear drive lies in a horizontal plane, the primary part for example is below the slider. The working spindle, for example of a cutting machine tool, is attached to the slider. The primary part is here attached to the underside of the slider by fixing means, for example bolts. The secondary is then usually located below the primary part.

The slider with attachments has a substantial weight of up to several tonnes. Currently, if the primary part must be maintained or replaced due to wear, this poses problems for the engineer. The primary part is installed below the slider such that this is not easily accessible. As well as the substantial weight of the slider with its attachments, it must also be noted that because of the secondary part, magnetic attraction forces act on all magnetisable elements and must also be overcome when removing the slider from the guide system.

This is particularly disadvantageous if the primary part is removed and falls onto the secondary part or is attracted by this. In this case the two parts adhere to each other so strongly that under some circumstances they can no longer be moved relative to each other, let alone be separated, without damaging the housing or the equipment itself. It is however necessary for these elements to remain moveable relative to each other in order to allow any dismantling or installation without removing the slider completely from the guide system.

BRIEF SUMMARY OF THE INVENTION

The invention is based on the task of improving a linear drive of the type described above in such a way that the primary part can easily be installed or removed.

To solve this task it is proposed that the primary part can be separated from the slider and moved on a bearing relative to the slider.

The bearing only becomes active when the primary part must be moved relative to the slider. The arrangement of the bearing is selected so as to ensure that the primary part does not adhere to the secondary part.

In a preferred embodiment of the invention, it is proposed to provide a roller or plain bearing or a roller or plain bed as a bearing. Various different concepts are conceivable for the bearing design. It is for example possible to set the primary part on a roller track which acts as a bearing. Alternatively it is also possible to arrange on the primary part itself rollers which roll on a corresponding support surface. Here the term "roller" is not restricted to a cylindrical body but naturally comprises also wheels or ball rollers. Alternatively it is however also possible to provide a plain bearing for example using magnetic fields to support the primary part. It is also proposed that a moveable bed or similar is provided which can be inserted in the gap between the primary and secondary parts in order to support the primary part and move it relative to the slider. Also the bed here is equipped with smooth running bearing elements such as roller bearings, ball bearings, rolling contact bearings, needle bearings and similar in order to achieve maximum ease of movement of the bed with the primary part. The bed for example here rests on the secondary part or is held by guide elements arranged at the side of this.

It is favourable here that on movement of the primary part on the bearing a movement gap remains between the primary part and the secondary part the movement gap can be set by corresponding matching of dimensions between the air gap which exists when the linear drive is in operation and the co-operating bearing elements. This gap can be selected relatively low but contact between the primary part and the secondary part should be avoided due to the very high adhesion forces.

In a preferred design of the invention it is proposed to provide a distance or height adjustment of the rollers on the primary part to set a distance between the primary part and the support surface. As a result of such design—in the same way as lowerable running gear—the rollers provided on the primary part can be lowered onto the support surface or approach this when required (for example for vertical or suspended use) and thus allow safe removal of the primary part from the slider.

A further development of the invention provides that the bearing can be moved on the support surface or roller track essentially at right angles to the direction of the movement of the slider and can be brought into the area of the primary part when the primary part must be moved relative to the slider. As a result of such a design, the roller track or contact surface on which are arranged the rollers provided on the primary part does not in any way disrupt the linear drive in normal operation. As a result the precision in production of these elements need not be selected too high in order to guarantee secure operation of the linear drive which can have a considerable length.

The bearing support surface or roller track can be moved either in a slot-like guide and thus be designed essentially stationary on the secondary part or alternatively can be introduced as a separate component for the case of dismantling or installing the primary part under the slider. A movement at right angles to the direction of movement of the slider on the guide system ensures corresponding positioning. A fixed design is advantageous if it must be ensured that the bearing is available at any time in order for example to monitor or maintain the primary part at short notice. The dismantlability of the bearing roller path or support surface is advantageous if the space in the linear drive between the primary and secondary part is relatively narrow or only small tolerances or working gaps are available and an extra element arranged in this area is disruptive.

The invention is not restricted to the use of a linear drive, the slider of which executes a horizontal movement. In the same way the invention can be implemented in a vertical or oblique movement of the slider. The common feature of these applications is a simple support and movement of the primary part relative to the slider, which is achieved by the proposal according to the invention.

As well as the development of the linear drive according to the invention, the invention also proposes the use of a bearing, in particular a roller board, for the relative movement of a primary part to a slider of a linear drive, where the primary part can be released from the slider moveable on a guide system. In particular the use of the roller board in this area offers a favourable advantage as the roller board is firstly a bearing element which is not expensive to produce and also allows easy movement of the primary part relative to the slider.

The roller board is here for example designed like a plate with rollers or wheels arranged on the end and supported either on the secondary part or at the side on the guide surfaces next to the secondary part. The primary part rests on the plate. Alternatively it is proposed to equip the roller board with a multiplicity of rollers located in particular between the primary part and the support surface, for example the secondary part, during movement of the primary part. On movement of the primary part, in this design there is also a relative movement of the roller board to the primary part, whereby in such an example a correspondingly generously dimensioned roller board is advantageous in order to transport the primary part completely out of the area under the slider. For this it is proposed according to the invention to design the roller board at least twice as long as the primary part (viewed in the movement direction).

Further advantageous features of the invention are described in the sub-claims.

DETAILED DESCRIPTION OF PREFERRED EMBODIMENTS

Figure 1:
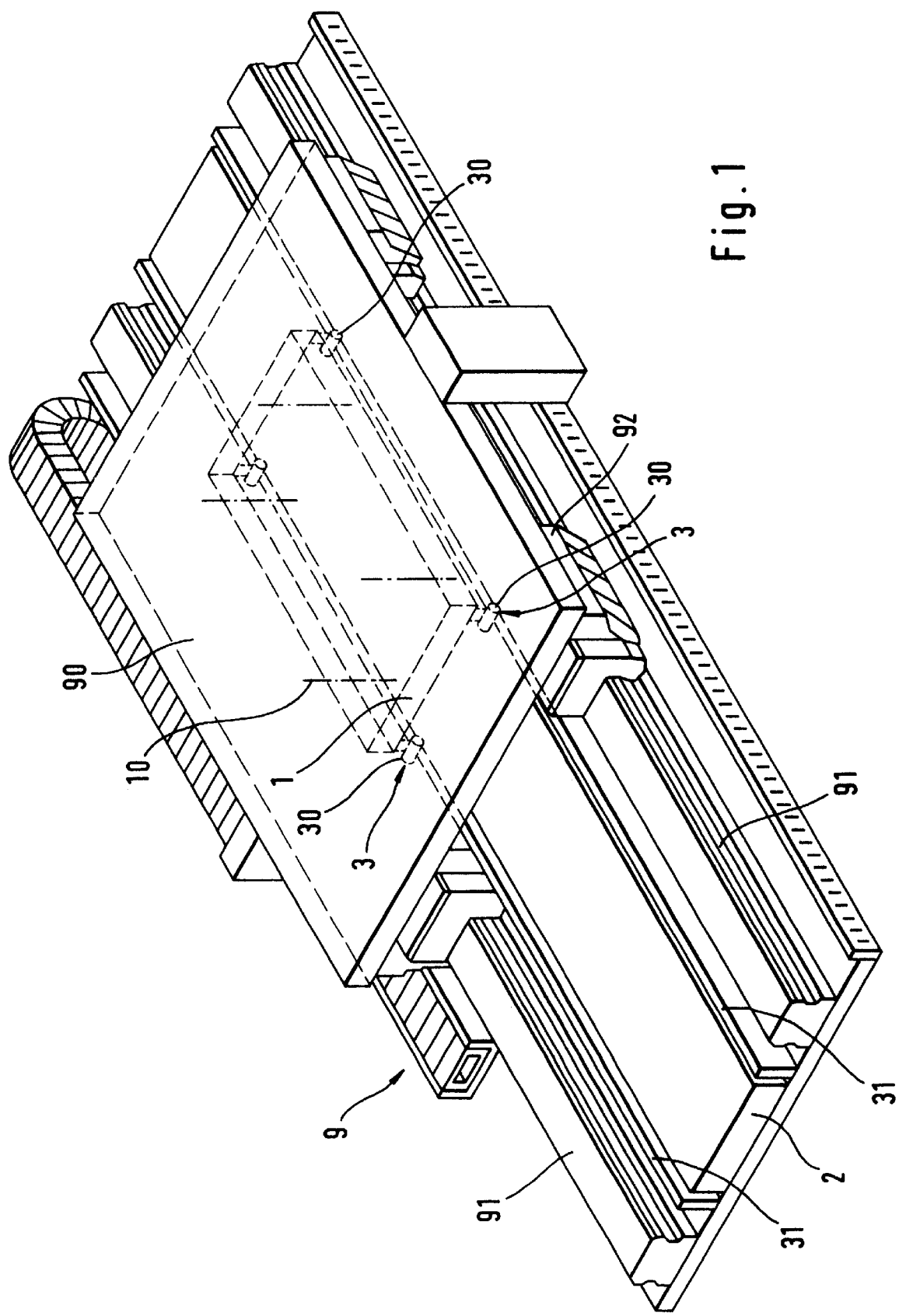
FIG. 1 shows a linear drive according to the invention, in a three-dimensional view.

FIG. 1 shows the diagrammatic structure of a linear drive according to the invention. A guide system 9 is provided which consists of a fixed slider guide 91 on which a slider 90 is mounted to be longitudinally displaceable. In fact this slider 90 has slider shoes 92. In particular there are four slider shoes, two slider shoes 92 for each slider guide 91, to support the slider 90 at four points.

The slider 90 has on its underside the primary part 1. The primary part 1 is thus mounted longitudinally displaceable with the slider 90. The primary part 1 is attached to the slider 90 by fixing elements or bolts 10 from below.

The primary part 1 in this design has an arrangement of coils through which current flows and the magnetic fields of which interact with the magnetic field of the secondary part 2 arranged on the base. Naturally a correspondingly inverted arrangement is included in the invention.

According to the invention it is proposed to provide a bearing 3 for the primary part for removal of the primary part 1, which allows the primary part 1 to move easily on the secondary part 2 during installation or removal without having to raise the heavy slider 90 from the guide system 9 or risk the primary part 1 adhering to the secondary part 2 due to the high magnetic forces.

In the embodiment shown in FIG. 1, the bearing 3 is designed such that on the primary part 1, on the bottom on the side facing the secondary part 2, rollers 30 are provided which, when the primary part 1 must be removed, support this for example on a support surface 31 whereby the primary part 1 can be displaced longitudinally on this support surface 31 by means of rollers 30 and thus moved relative to the slider 90.

The rollers 30 are arranged so that these do not interact with the guide way 31 when the primary part 1 is mounted and operated normally. The rollers 30 can roll either on the support surface 31 or on surface 22 of the secondary part 2.

Figure 2:
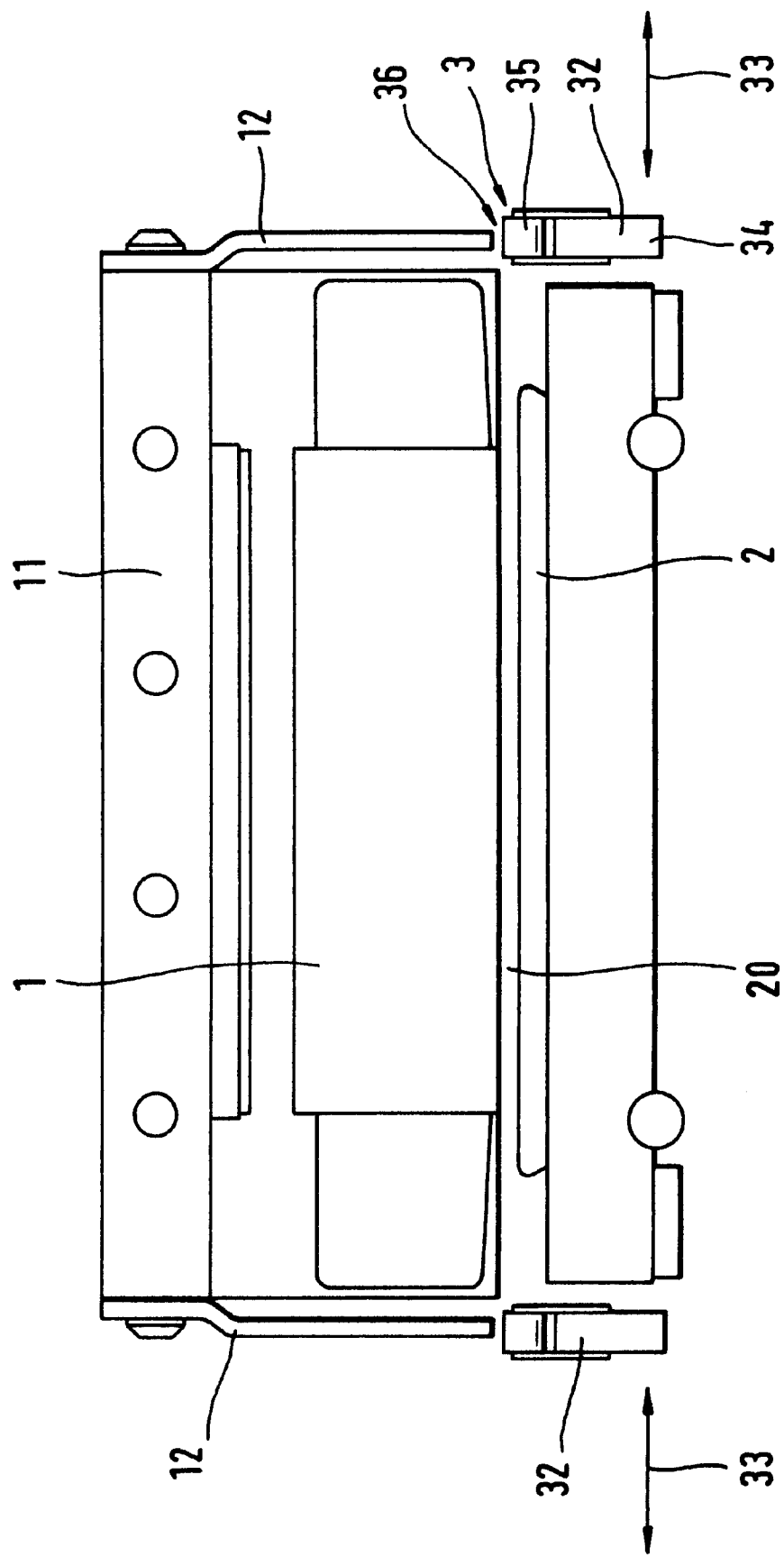
FIG. 2 shows a detail of a linear drive according to the invention in a first variant, in front view.

FIG. 2 proposes another type of bearing of the linear drive according to the invention. FIG. 2 (also FIGS. 3 and 4) shows in a side view the co-operation of the primary part 1 with the secondary part 2, where the additional elements of the guide system i.e. slider 90 or slider guide 91 are not shown for greater clarity.

In the installed position there is an air gap 20 between the primary part 1 and the secondary part 2. The size of the air gap 20 can in principle be designed in variable forms. It is selected to achieve maximum efficiency of the electromagnetic drive between the primary part 1 and the secondary part 2.

In the view shown in FIG. 2, the primary part 1 essentially consists of a housing 11 with various fittings. On the side to the left and right next to housing 11 are provided cooling surfaces 12 in which part of the electrical energy of the drive converted into thermal energy is dissipated in order to cool the guide system 9. The arrangement of these cooling surfaces 12—which may be guide plates or similar—is utilised to help establish the bearing 3. A roller track 32 is proposed as a bearing 3. The roller track 32 consists of a carrier profile 34 which carries rollers 35 mounted rotatable about an essentially horizontally oriented axis on its upper end facing the primary part 1. The roller track 32 is arranged on both sides next to the secondary part 2, essentially parallel to the direction of movement of the slider 90 on the guide system 9.

In a variant of the invention it is proposed that the roller track 32 (or also the support surface 31 in FIGS. 1 and 4) be mobile. In the case where bearing 3 is not required, it is possible for the elements necessary for bearing 3 to be brought or positioned out of the action area of the primary part 1, thanks to this mobility in the direction of double arrow 33.

FIG. 2 shows a gap 36 between the underside of the cooling surface 12 and the support surface or edge of roller 35. This gap 36 must be dimensioned smaller than the air gap 20 between primary part 1 and secondary part 2. Such a design ensures that on dismantling of the primary part 1, the primary part 1 first comes to rest on bearing 3 before the air gap 20 is completely overcome and the primary part 1 adheres to secondary part 2 such that movement is impossible. The same geometric conditions are also found in FIG. 3.

Figure 3:
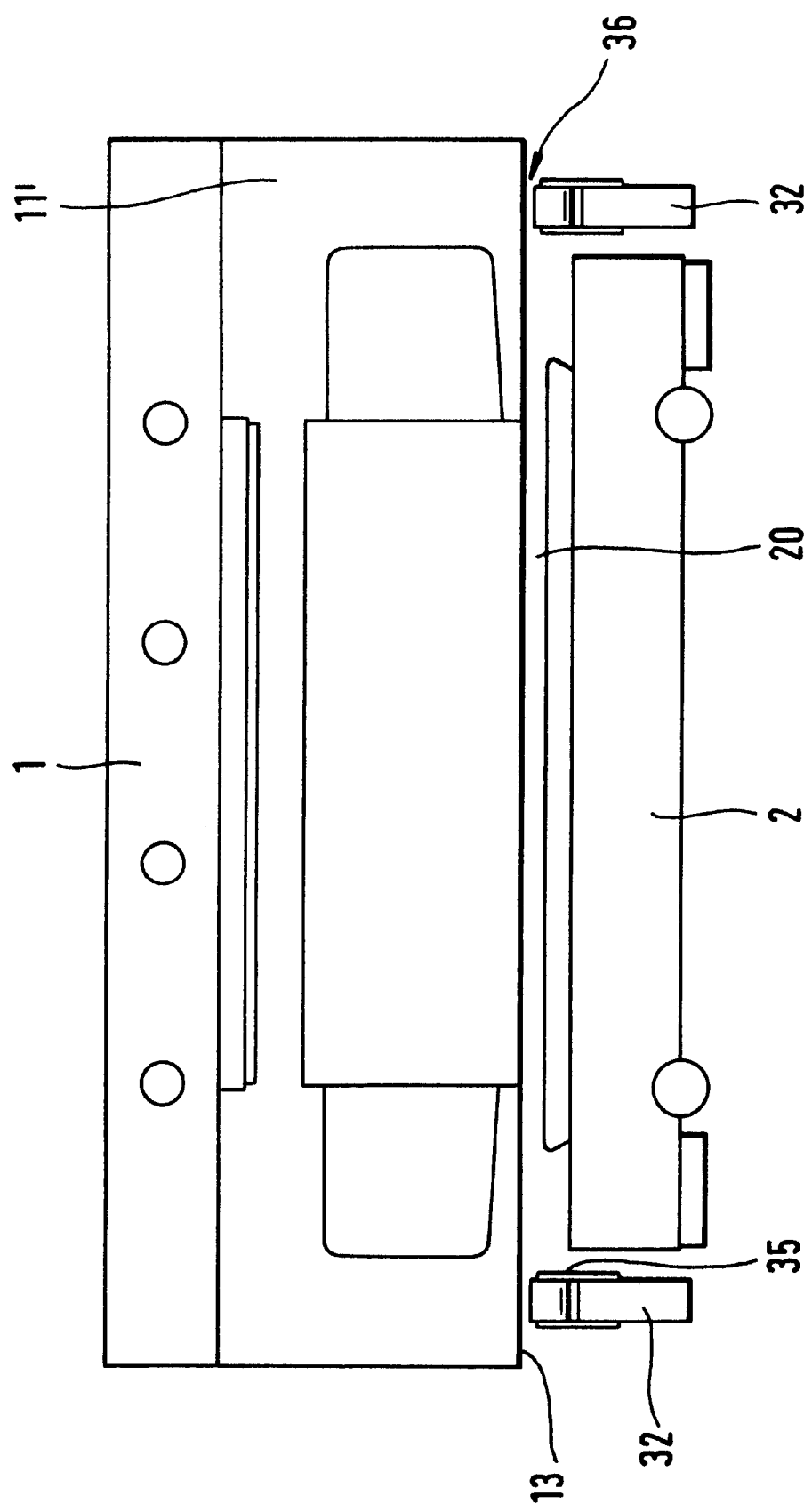
FIG. 3 shows a detail of a linear drive according to the invention in a second variant, in front view.

FIG. 3 also provides a roller track 32 for bearing 3 of primary part 1. Here however the housing 11' is extended so that it can rest directly on roller track 32, i.e. no additional cooling surfaces 12 arranged at the side are provided. Here the housing 11' lies on the roller track 32 in particular with the side housing edges 13.

Figure 4:
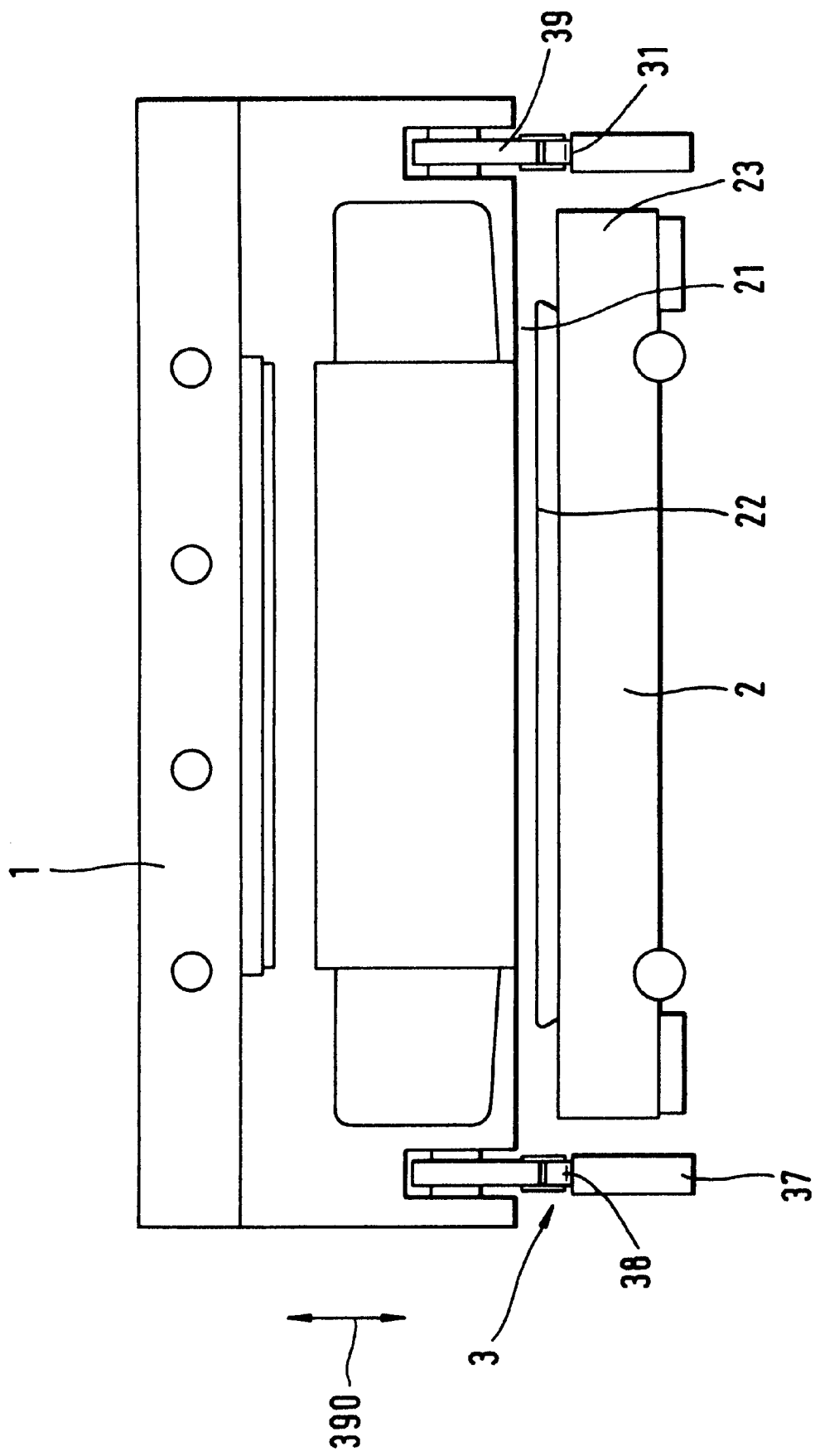
FIG. 4 shows a detail of a linear drive according to the invention in a third variant, in front view.

FIG. 4 in contrast to the designs in FIGS. 2 and 3 shows the primary part 1 lying on bearing 3 so that the primary part 1 can be moved relative to slider 90 (not shown). It should be noted that a movement gap 21 remains between primary part 1 and secondary part 2. The size of movement gap 21 can be determined by the position of the rollers 38 on the primary part 1 in relation to the support 37. In the design of the invention shown here, roller 38 is arranged on the underside of primary part 1 facing secondary part 2. Roller 38 here corresponds to a support or running surface 37. FIG. 4 shows that the support 37 is arranged on the secondary part 2. It is however also possible for the roller 38 to roll on the surface 22 of secondary part 2 or the substructure 23 of secondary part 2. The roller 38 is here on a carrier, the position of which can be adjusted by height adjustment 39. This allows vertical alignment of roller 38, whereby in particular the primary part 1 can be lowered along double arrow 390 via this height adjustment 39. This height adjustment 39 can be achieved with simple means. For example a simple spindle bearing or an electromagnetic or pneumatic or hydraulic working cylinder or drive can be used for this. Such a design achieves firstly a higher comfort level as the rollers 38 are always available on the dismantling of primary part 1, at the same time the complexity of the dismantling of primary part 1 is clearly reduced as automatically arranged means are available. In this context it is also possible to provide fixing elements which can also be automatically activated or controlled. Here it is possible to design the controls accordingly so that the lowering movement of the rollers 38 or the provision of bearing 3 is achieved before the fixing element is activated to release the primary part 1 from the slider 90.

In a slightly simpler design, instead of a fully automatic design, a semi-automatic or manual design can be selected. Here for example manual drives, for example lifting spindles, are provided in order to lower the rollers/rolls and for example then decouple the primary part from the slider. This can for example be achieved via a common drive which is accessible on the face of the primary part in the direction of the secondary part. Naturally it is also possible to perform these two movements separately, for example with their own drives, but a mechanically coupled procedure as proposed ensures that the rollers are first lowered before the primary part is released from the slider.

For installation, the procedures described above (automatic and manual) are simply reversed.

Suitable adjustment gauges or aids are used for precise positioning on assembly, for example when positioning the primary part on the slider, such that the corresponding surfaces lie planar.

In the same way the concept of a bearing 3 which can be lowered on or brought to the primary part 1 can also be applied in the variants shown in FIGS. 3 and 2.

Figure 5:
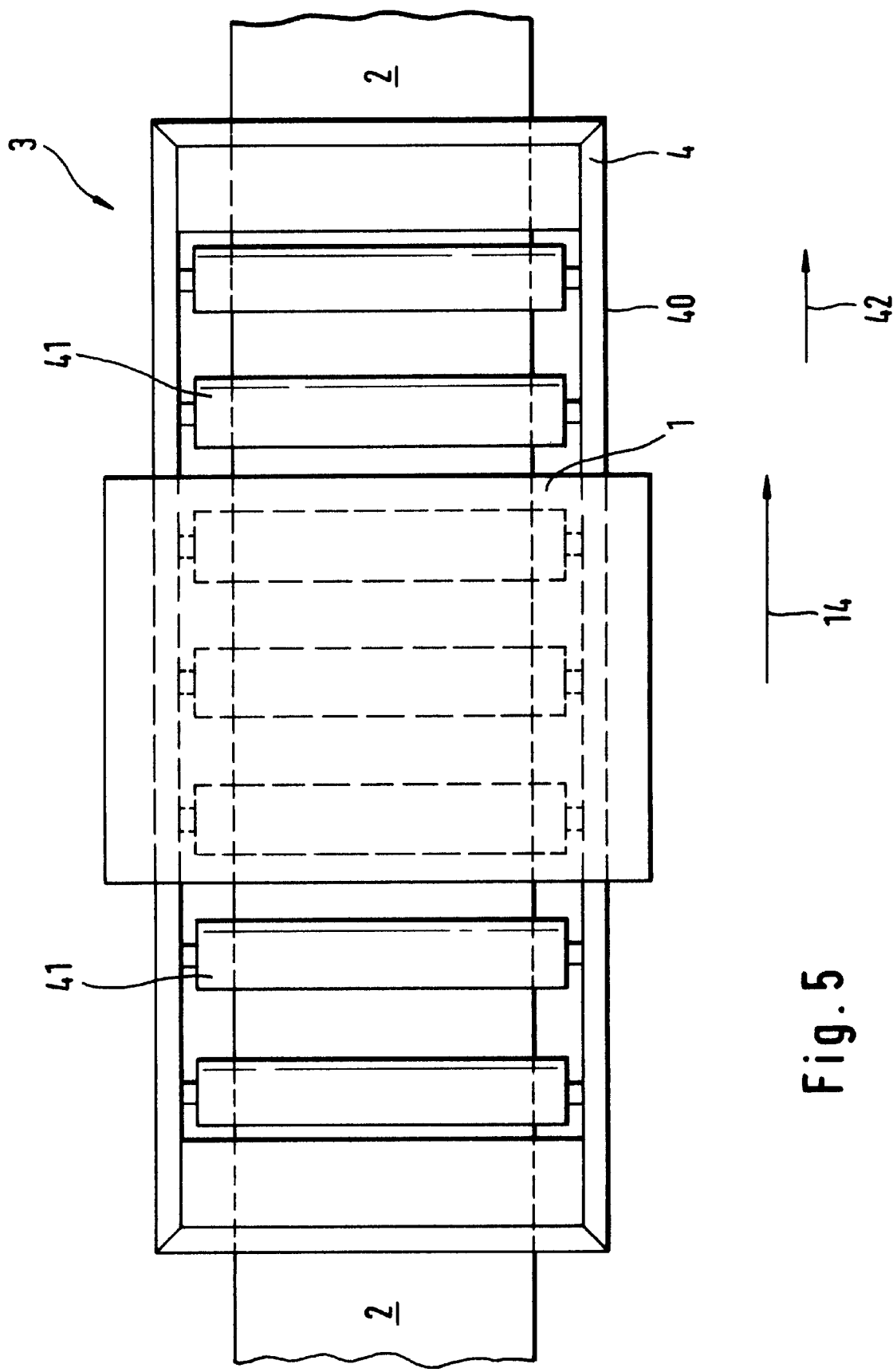
FIG. 5 shows in plan view a further design of the bearing of a linear drive according to the invention.

FIG. 5 shows a further variant of the invention. Here a bearing 3 designed as a roller board 4 is used for removal of the primary part 1. The roller board 4 has a length which is essentially double the length of the primary part 1 in the removal direction (usually parallel to the slider guide). The roller board 4 is equipped with a multiplicity of rollers 41, the thickness of which is set such that the entire arrangement can slide into the air gap 20 between the secondary part 2 and primary part 1 when the primary part 1 must be removed. Here it is sufficient if the roller board can be introduced into the air gap which then exists between the primary part 1 and secondary part 2. The diameter of the rollers 41 is then adapted to this air gap. To this extent the view shown in FIG. 5 should be regarded as diagrammatic. It does not correspond to true scale. When the primary part 1 is deposited on roller board 4, the roller board 4 is simply drawn along a movement direction, for example along the secondary part 2. This is indicated by arrow 42. The roller board 4 here consists of a frame 40 with a handle. The rollers 41 are mounted on both sides on the frame.

By the movement of rollers 41, the primary part 1 rolls out on the rollers 41. There is therefore a relative movement of primary part 1 to the roller board 4. As a result the primary part 1 to be removed moves at double the speed of roller board 4, the movement of primary part 1 is indicated with arrow 14.

Although the invention has been described in terms of specific embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. Linear drive, consisting of
   (a) a guide system,
   (b) a slider movably mounted on said guide system,
   (c) a primary part arranged on said slider, and
   (d) a fixed secondary part, which interacts with said primary part such that said slider can be moved on said guide system,
   wherein said primary part can be separated from said slider and moved on a bearing relative to said slider.

2. Linear drive according to claim 1, wherein a roller or plain bearing or bed is provided as a bearing.

3. Linear drive according to claim 1, wherein on movement of said primary part on said bearing, a movement gap remains between said primary part and said secondary part.

4. Linear drive according to claim 1, wherein as a bearing a roller board is provided which, on movement of said primary part relative to said slider, moves relative to said primary part and to said slider.

5. Linear drive according to claim 4, wherein said roller board is at least twice as long as said primary part.

6. Linear drive according to claim 1, wherein as a bearing, on said primary part are provided rollers which roll on a support surface or on the surface of said secondary part facing said primary part.

7. Linear drive according to claim 6, wherein distance or height adjustment of said rollers on said primary part is possible to set the distance between said primary part and said support surface.

8. Linear drive according to claim 1, wherein as a bearing there is provided a roller track on or against which rests said primary part.

9. Linear drive according to claim 8, wherein a housing of said primary part interacts with said roller track.

10. Linear drive according to claim 8, wherein a housing of said primary part is provided with a cooling or guide plate which interacts with said roller track.

11. Linear drive according to claim 1, wherein said bearing is arranged essentially parallel to the direction of movement of said slider.

12. Linear drive according to claim 1, wherein said bearing can be moved essentially at right angles to the direction of movement of said slider and can be brought into the area of said primary part when said primary part must be moved relative to said slider.

13. Linear drive according to claim 1, wherein the movement of said slider is horizontal, vertical or oblique.

14. Linear drive according to claim 1, wherein said primary part is connected to said slider by fixing bolts or automatic, semi-automatic or manually controllable fixing elements.

* * * * *